(12) United States Patent
Liu et al.

(10) Patent No.: US 6,339,569 B1
(45) Date of Patent: Jan. 15, 2002

(54) OPTICAL DATA CARD SERVO WRITER

(75) Inventors: Jeffrey F. Liu; Francis K. King, both of San Jose, CA (US)

(73) Assignee: Dcard, Inc., Milpitas, CA (US)

( * ) Notice: Subject to any disclaimer, the term of this patent is extended or adjusted under 35 U.S.C. 154(b) by 0 days.

(21) Appl. No.: 09/289,271

(22) Filed: Apr. 9, 1999

Related U.S. Application Data

(60) Provisional application No. 60/081,257, filed on Apr. 9, 1998.

(51) Int. Cl.[7] .................................................. G11B 7/00
(52) U.S. Cl. ..................................... 369/47.27; 369/53.3
(58) Field of Search ........................... 369/275.1, 275.2, 369/275.3, 275.4, 44.17, 98, 47.27, 53.3

(56) References Cited

U.S. PATENT DOCUMENTS

| | | | | |
|---|---|---|---|---|
| 4,571,714 A | * | 2/1986 | Mathews et al. | 369/275.3 |
| 4,831,470 A | * | 5/1989 | Brunnett et al. | 369/32 |
| 6,031,816 A | * | 2/2000 | Inui et al. | 369/275.4 |
| 6,069,870 A | * | 5/2000 | Maeda et al. | 369/275.4 |

FOREIGN PATENT DOCUMENTS

| | | | |
|---|---|---|---|
| JP | 10-320943 | * 12/1998 | 369/275.4 |

* cited by examiner

*Primary Examiner*—Nabil Hindi
(74) *Attorney, Agent, or Firm*—Bo-In Lin

(57) ABSTRACT

This invention discloses an optical servo writer. The optical servo writer includes an optical pickup head for rotationally moving over and writing servo data in an optical flat data-storage medium. The optical servo writer further includes a clock head for providing clock signals to the pickup head and to write clock signals in the clock disk. The optical servo writer further includes a control circuit for controlling The optical pickup head for writing the servo data on The optical flat data-storage medium. The optical servo writer further includes a servo pattern layout circuit for controlling The optical pickup head for writing the servo data on The optical flat data-storage medium with predefined servo patterns. The optical servo writer further includes a derived index control circuit for deriving indices from a fixed index provided on The optical flat data-storage medium. The optical servo writer further includes a fixed index and clock track circuit for providing a fix index and a clock signal for controlling The optical pickup head for writing the servo data on The optical flat data-storage medium. The optical servo writer further includes a head move circuit for controlling a movement of The optical pickup head for writing the servo data on The optical flat data-storage medium. The optical servo writer further includes a medium movement circuit for controlling a linear movement of the optical flat data-storage medium for writing the servo data on the optical flat data storage medium.

2 Claims, 15 Drawing Sheets

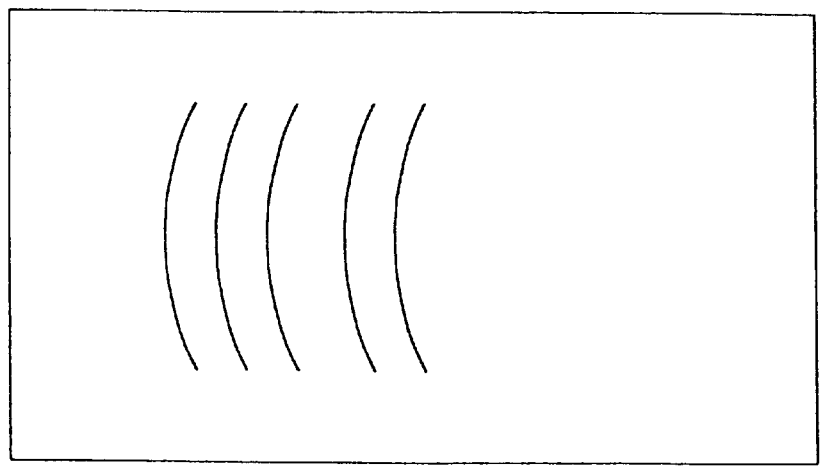
Figure 5A. Layout of Data Tracks
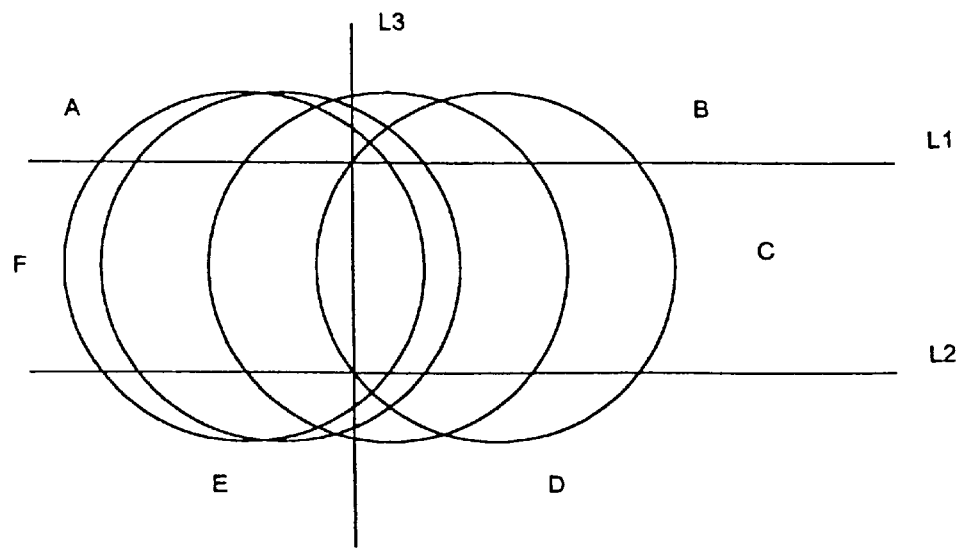
Figure 5B. Configure data track arc from circular track

| | | | | | | | | Data Track N+5 |
|---|---|---|---|---|---|---|---|---|
| S Y N & A D M | S T I D X | E D I D X | G R A Y C O D E | A | A | | | |
| | | | | | B B | | B B | |
| | | | | | | | | Data Track N+4 |
| | | | | A A | | A A | | |
| | | | | | | | | Data Track N+3 |
| | | | | | B B | | B B | |
| | | | | | | | | Data Track N+2 |
| | | | | A A | | A A | | |
| | | | | | | | | Data Track N+1 |
| | | | | | B B | | B B | |
| | | | | | | | | Data Track N |
| | | | | | | A | | |

Figure 5C. Servo Segment across data tracks

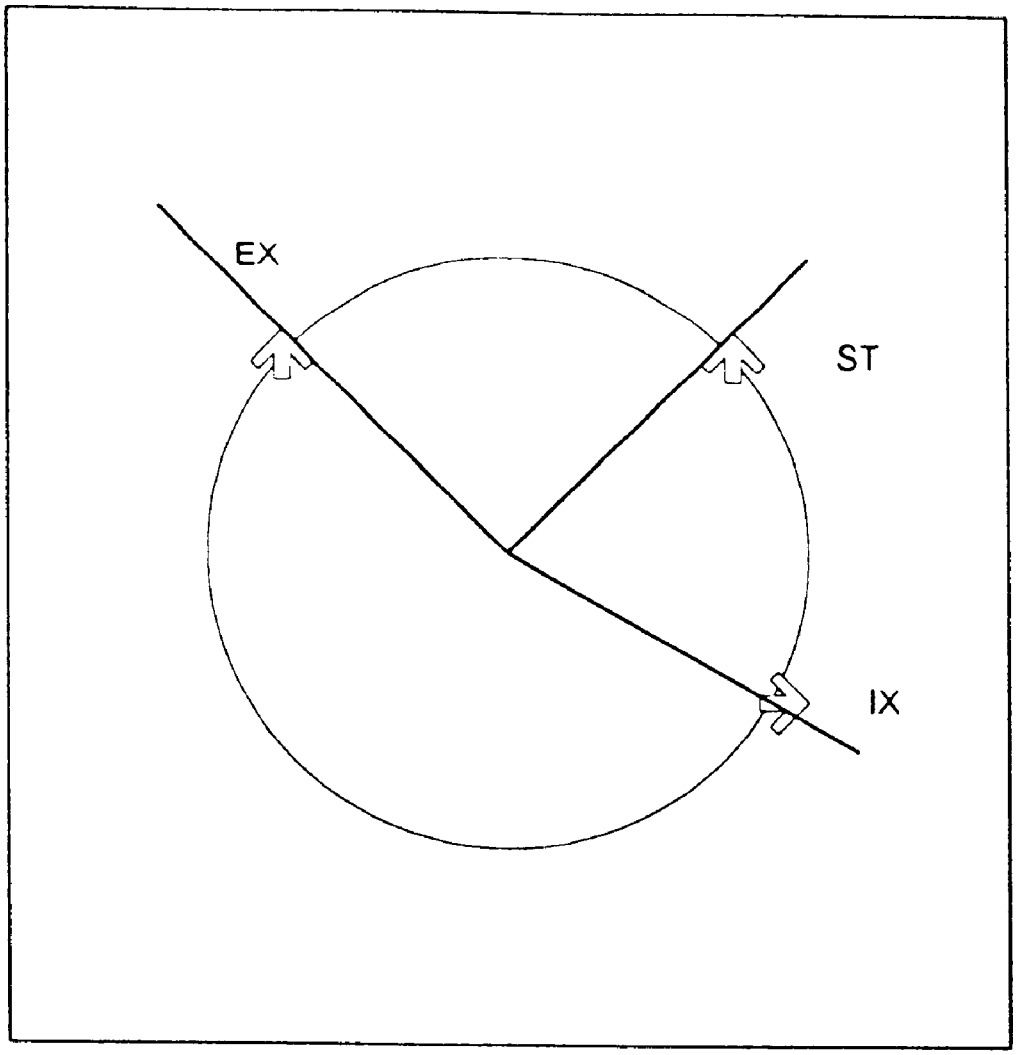
Figure 5D. Position indexes

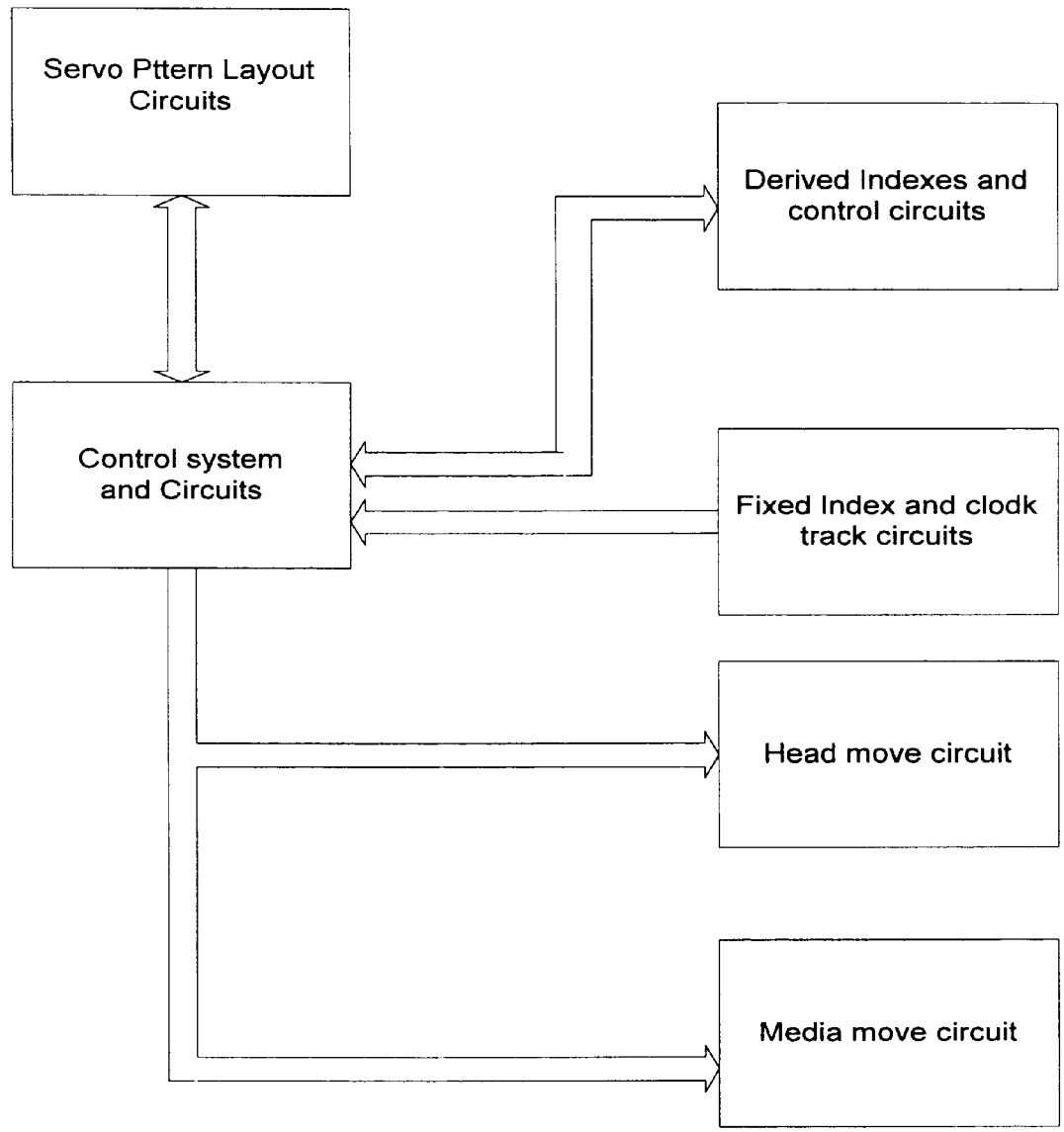
Figure 5E. Logic block of Control Arrangement

OPTICAL DATA CARD SERVO WRITER

This application is a Continuation-in-Part (CIP) Formal Application claims a Priority Date of Apr. 9, 1998, benefited from a previously filed Provisional Application 60/081,257 by the same Applicants of this application.

BACKGROUND OF THE INVENTION

1. Field of the Invention

This invention relates generally to systems and method for reading data from and writing data to data storage medium by employing the optical recording technology. More particularly, this invention is related to an improved optical data access system. The data access system is implemented in a portable data card drive device and in a high speed subsystem for reading data from and writing data to an optical data card which has a novel data track configuration for storing data with uniform density. Data can be stored for user applications or related to application system configurations.

2. Description of the Prior Art

Conventional technology of reading-writing data on concentric circular data tracks often presents a problem that the data-bit density varies between the outer tracks and the inner tracks. The variable bit density in data storage is due to a geometrical factor that the outer data tracks are much longer in length than the inner tracks. A common practice is to form the inner tracks with a capacity to store the data bit at a higher bit density. A more complicate servo control system implemented with more complex signal-processing algorithms is required due to the variations of data storage density between different data tracks. Additionally, by varying the data storage density from the inner tracks toward the outside tracks, the data transfer rate is also changed in accessing data from the inner tracks then outside tracks. Such variation may also cause difficulties and complications in processing the data. Higher error rates may incur due to these variations between the inner tracks and the outer tracks.

Therefore, a need still exists for an improved data-card drive system to overcome the aforementioned difficulties encountered in the prior art. Specifically, this storage card drive system must provide a uniform density for data storage and a data-card drive system to access the data-storage card. Furthermore, it would be desirable that this system is portable and is also provided with several standardized sizes for processing standardized data-storage cards.

SUMMARY OF THE PRESENT INVENTION

Therefore, an object of the present invention is to provide a data storage-card drive system with a pickup head moving above the data-storage card in rotational movement. The data read-write functions are enabled only for arc-segments of the rotational movement such that the data tracks are arranged as plurality of parallel arcs, e.g., half-circles, to overcome the aforementioned difficulties and limitations encountered in the prior art.

Specifically, it is an object of the present invention to provide a data-storage card drive system with a pickup head driven by a motor, e.g., a brushless motor, to rotate over the data-storage card with the rotation axis perpendicular to the card surface. The motor is mounted on a carriage for making horizontal movement along a longitudinal direction of the data card. The position of the pickup head is then servo-controlled by moving the carriage and the motor while the data storage card either stays at a fixed position or only pickup head is rotating and the card is making horizontal linear movements.

Another object of the present invention is to provide a data-storage card drive system for performing the data access tasks over a data storage medium surface, which has uniform data storage density. A new configuration of data-tracks formed as parallel arc or arc-segments, e.g., semi-circular data track, is implemented such that all data tracks have substantially the same length for data storage and the data bits are stored with uniform density.

Another object of the present invention is to provide a data-storage card drive device implemented with a subsystem provided with local memory storage for conveniently interface with personal computers or peripheral devices to achieve higher speed operations.

Briefly, in a preferred embodiment, the present invention discloses an optical servo writer. The optical servo writer includes an optical pickup head for rotationally moving over and writing servo data in an optical flat data-storage medium. The optical servo writer further includes a clock head for providing clock signals to the pickup head and to write clock signals in clock disk. The optical servo writer further includes a control circuit for controlling the optical pickup head for writing the servo data on the optical flat data-storage medium. The optical servo writer further includes a servo pattern layout circuit for controlling the optical pickup head for writing the servo data on the optical flat data-storage medium with predefined servo patterns. The optical servo writer further includes a derived index control circuit for deriving indices from a fixed index provided on the optical flat data-storage medium. The optical servo writer further includes a fixed index and clock track circuit for providing a fix index and a clock signal for controlling the optical pickup head for writing the servo data on the optical flat data-storage medium. The optical servo writer further includes a head move circuit for controlling a movement of the optical pickup head for writing the servo data on the optical data-storage medium. The optical servo writer further includes a medium movement circuit for controlling a linear movement of the optical flat data-storage medium for writing the servo data on the optical flat data-storage medium.

These and other advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 5A and 5B show the data tracks on an optical data card with data tracks for writing servo data thereon;

FIG. 5C shows an exemplary pattern of servo data written onto a data track;

FIG. 5D shows the position indexes for servo control; and

FIG. 5E is a functional block diagram to illustrate the control logic implementation of a servo writer of this invention.

DETAILED DESCRIPTION OF THE PREFERRED EMBODIMENT

Figure 1A:
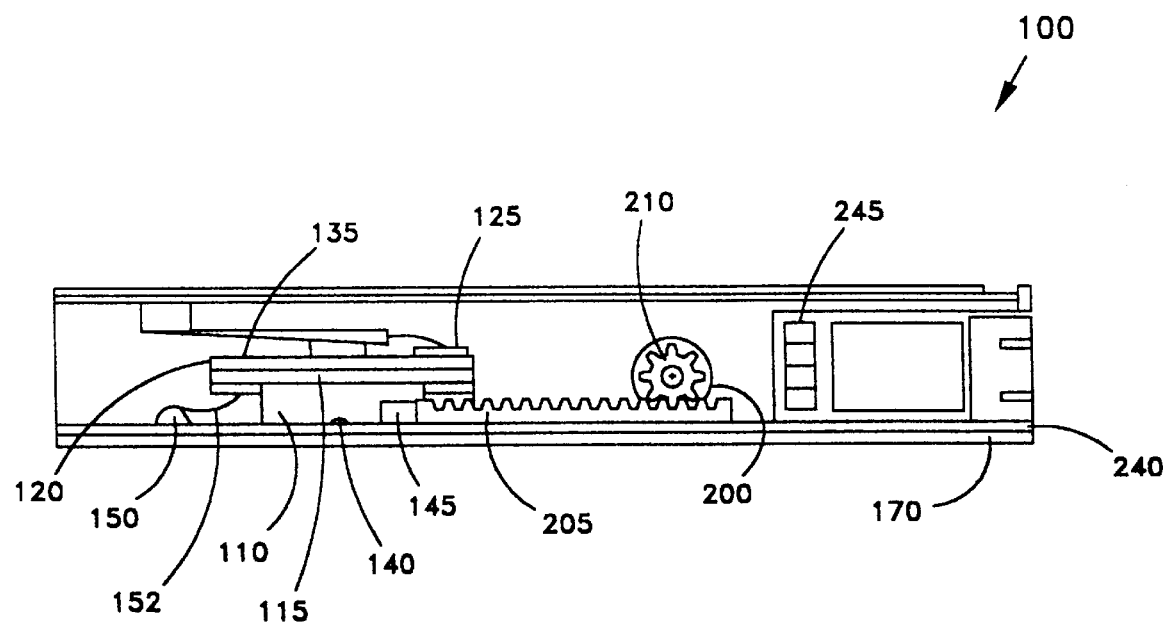
FIGS. 1A and 1B shows a cross sectional view and a top view respectively of a data card drive system of this invention.
Figure 1B:
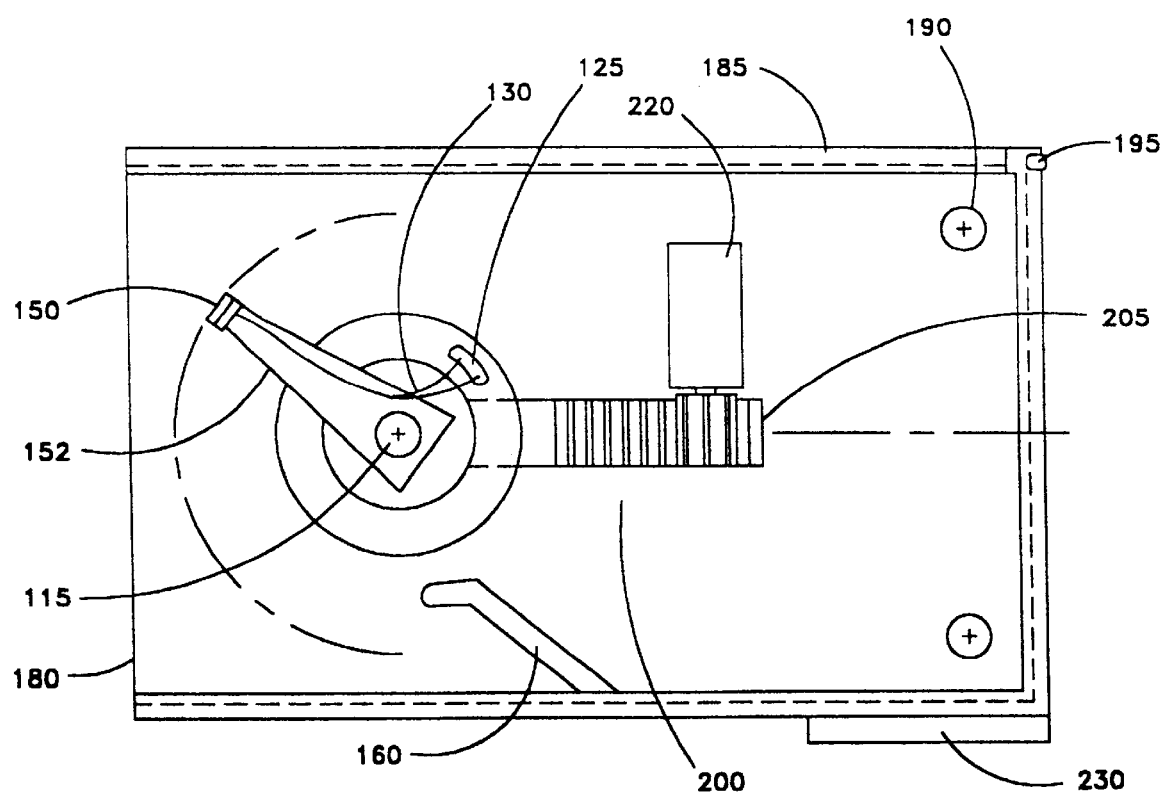

FIGS. 1A and 1B show a cross sectional view and a top view respectively of a data-card drive 100 of the present invention. The data-card drive 100 can be configured for reading and writing data-cards of different sizes, e.g., a PCMCIA type card or common credit card size. The data-card can also be of different shapes such as a square, a rectangular, a circular disk, or a card with straight and parabolic edges or different types of arc-edges. The data-card drive 100 includes a motor 110, e.g., a DC brushless motor. The motor 110 is provided to operate at a low speed to conserve battery power, at high speeds to achieve fast data access time. The motor 110 is further provided to function at two different modes, i.e., a sleep mode when not being deployed, and a wake up mode for normal data access operations. The motor 110 is mounted on a carriage 115 with a pickup head assembly mounted to the motor rotating shaft assembly. Half of an optical transformer, 120-1 which can either being a ring type, a round-disk type, or other geometrical shapes, is mounted onto the motor rotating shaft assembly, the other half of the magnetic transformer 120-2 of similar configuration is mounted to the fixed part of motor assembly. Signal wires 130 form head are soldered onto the rotating half of the transformer 120-1 with the soldering pad 125, that can also be a spring pressed connection, for transmitting the read/write signals via the magnetic transformer 120. The magnetic transformer 120-1 and the soldering pad 125 are covered by a magnetic flux shield plate 135 for shielding the magnetic flux generated by the magnetic transformer to prevent DC erase of data. A ground spring 140 is applied to perform the function of dissipating electric static discharges. Optionally, a brake-magnet 145 is provided to fix the "parking" position of the motor 110 in the sleep or power off mode during the time when there is no data access activities.

A read/write head 150 is mounted via an extended head-arm 152 to the brushless motor 110 via a head-arm mounting assembly mounting holes 155 to the head carriage 115. A head loading/unloading arm 160 is mounted on the base-plate 170. The loading/unloading arm 160 presses to the head-arm 152 at the unload position at a drive-device power-off mode. The loading/unloading am 160 is removed from the head-arm 152 when data card 180 is loaded and the power for the drive device is turned on.

In order to assist a smooth loading of the data card 180 into the drive device 100, a card guide plate 185 is provided.

The data card drive system 100 further includes one or several data card pins 190 to engage and fix the position of the data card 180 when the data card 180 reaches a designated and operational position. The data card pins 190 increases the compatibility and interchangeability of different types of data cards for data access operations using this data card drive system 100. The drive system 100 further includes an on/off switch 195, which is turned on when the data card 180 reaches its final position.

Figure 1C:
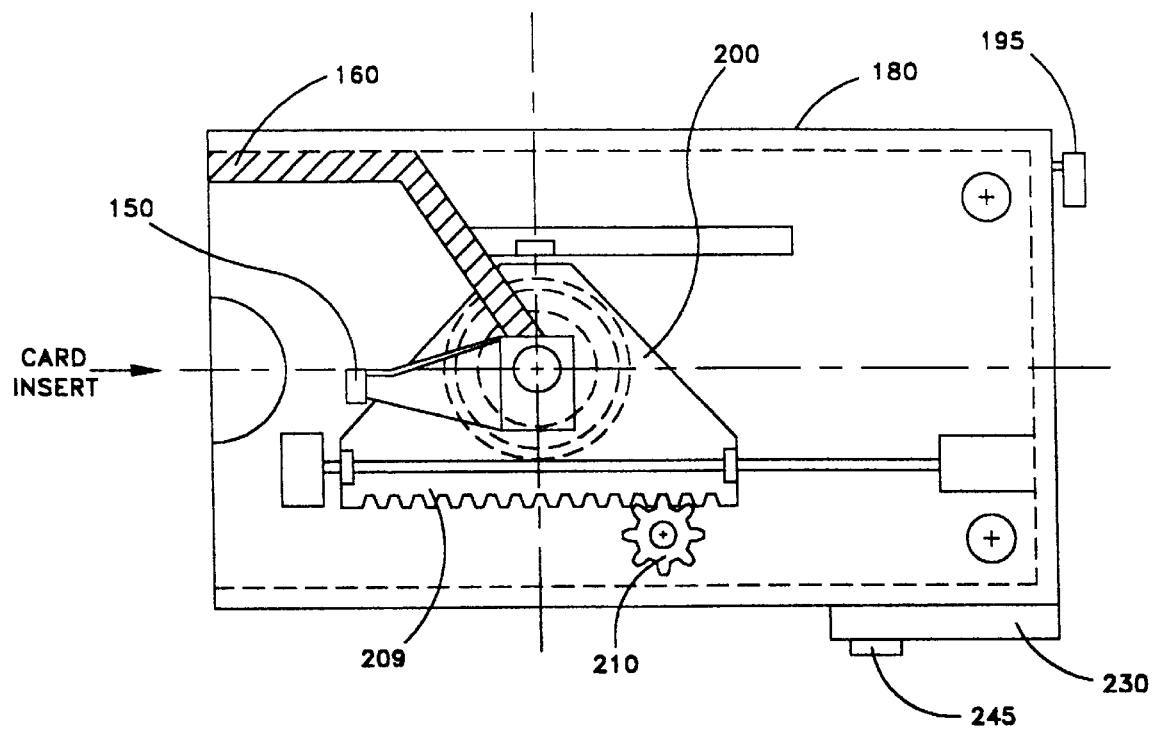
FIGS. 1C and 1D are cross sectional views for showing the details for the motor rack mounting and the head loading/unloading assembly.
Figure 1D:
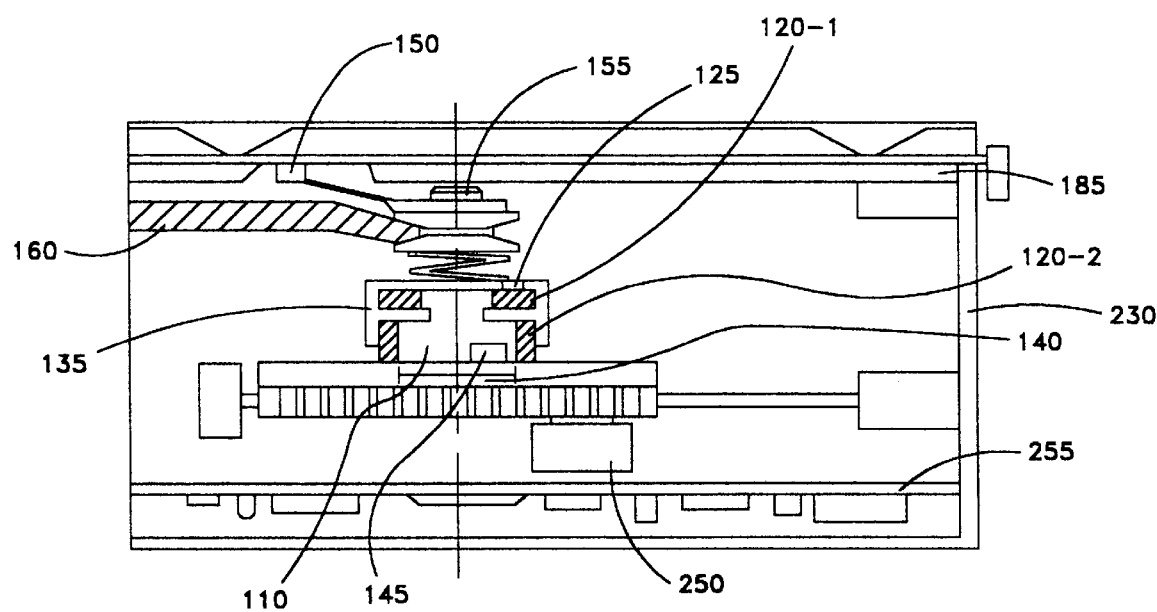

The brushless motor 110 is mounted onto a motor-rack mount 200 with a rack 205 and a pinion 210. A step motor 220 is employed to control the linear movement of the motor 110 or the movement of the data card 180. The drive device 100 further includes a LCD display 230 to indicate the track position of the head 150 in reading or writing of data onto the data card 180. Mounted on the base plate 170 is a printed circuit board 240, which supports a track locator switch 245. The printed circuit board 240 further supports various kinds of circuits for performing the functions of control and data access. These circuits includes head tracking circuit 250, IC preamplifier 255, head loading/unloading circuits, disable/enable read-write function circuit servo control integrated circuit (IC), motor control IC, data separator IC, ADI interface IC, USB interface IC, PCMCIA interface IC, USB connector, PCMCIA connector, and other circuits required for controlling and operating the data card drive system. FIGS. 1C and 1D are cross sectional views for showing the details of the rack 205, the pinion 210, and the head loading and unloading assembly 160 to lift the head when the drive device 100 is turned off. A head arm lifter 103 has a wire type hook 103A positioned above the pickup head arm 152. The sliding of the head arm lifter 103 with the wire type hook 103A along with the motor shaft assembly can lift or lower the pickup head arm 152 and in turn lift or lower the pickup head 150. The pickup head arm 152 is rotating with the motor shaft and the pickup head 150. Regardless of where the pickup head 150 when the rotational movement stops, the arm 152 can always engage into the head lifter 103 slot and sliding the head lifter 103 along the motor shaft.

The drive device 100 as described above, is also provided with an option to perform the functions of a servo writer. A novel servo writer is disclosed in this invention which can be manufactured with simplified manufacturing processes. The servo writer includes a storage card loading assembly that is structured similarly to a card guide 185 of the device 100. The storage card can be inserted horizontally inserted for direct contact with the pickup head 150. Or, depending on specific application, the data storage card can be inserted from a vertical slot opening and then flip over for contact with the pickup head. In writing the servo data, the pickup head 150 is rotating along different data tracks. The pickup head is moved to different tracks during the operation of writing servo data by either moving the head/monitor assembly mounted on the shaft or by keeping the head/motor assembly stationary while horizontally moving the data storage card. The magnetic transformer is employed in writing the servo data onto different data tracks where the cables are arranged without being twisted when the pickup head is making rotational movement.

Figure 1E:
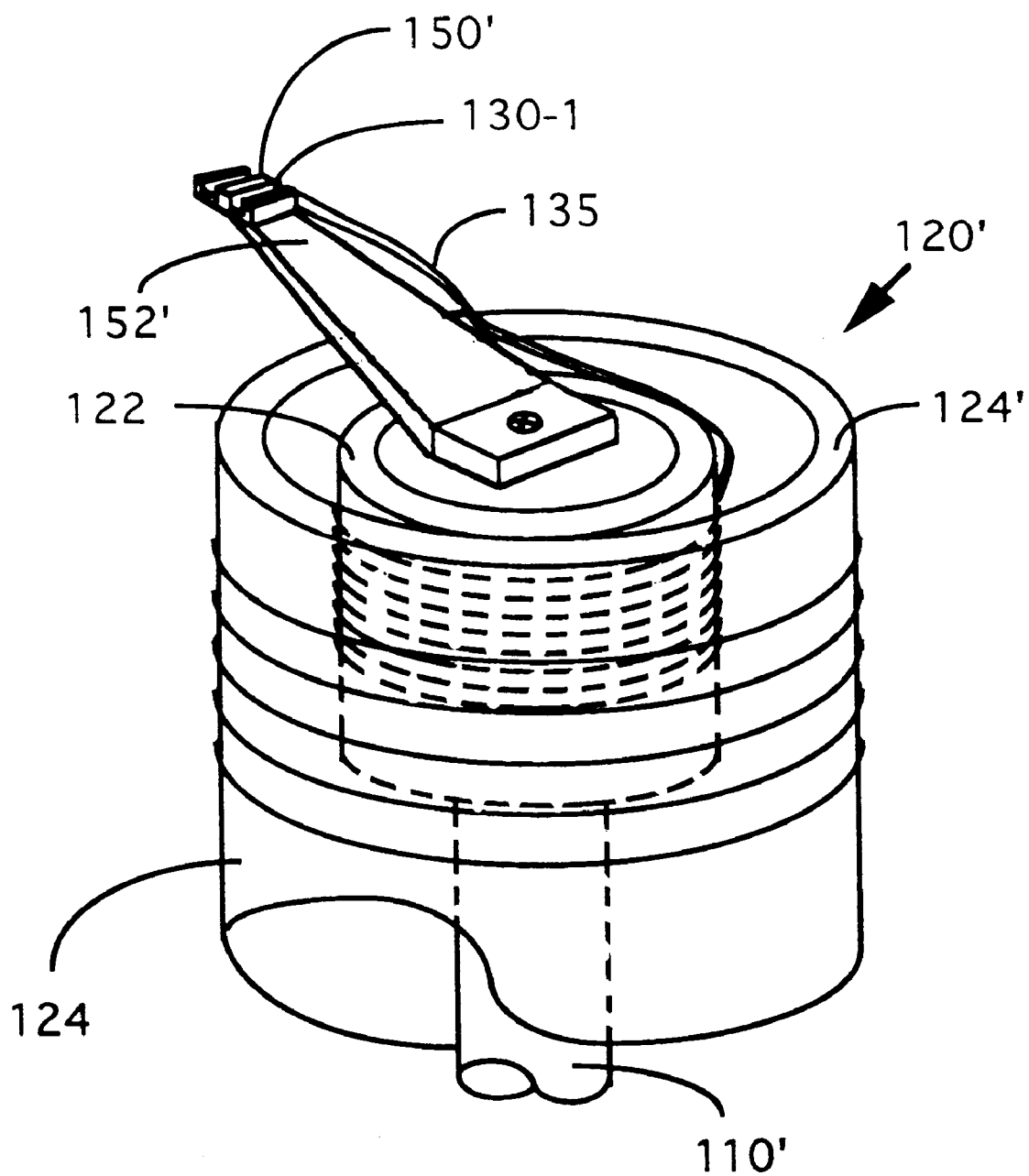
FIG. 1E shows a perspective view of the pickup head and the wires winding configuration serving as read/write data signal transformer.
Figure 1F:
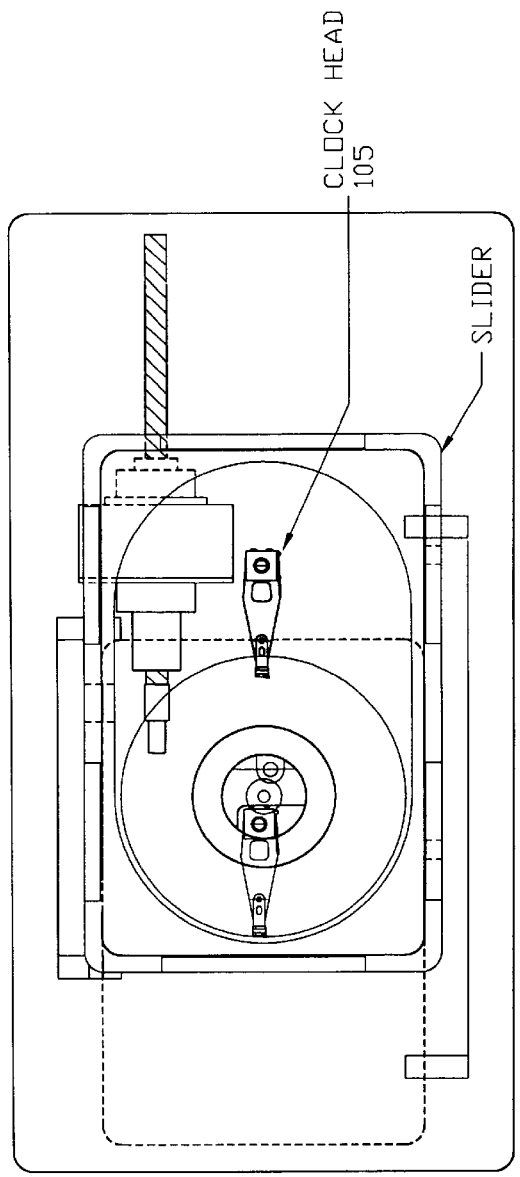
FIGS. 1F and 1G show the top view and cross sectional view respectively of an optical servo writer of this invention.
Figure 1G:
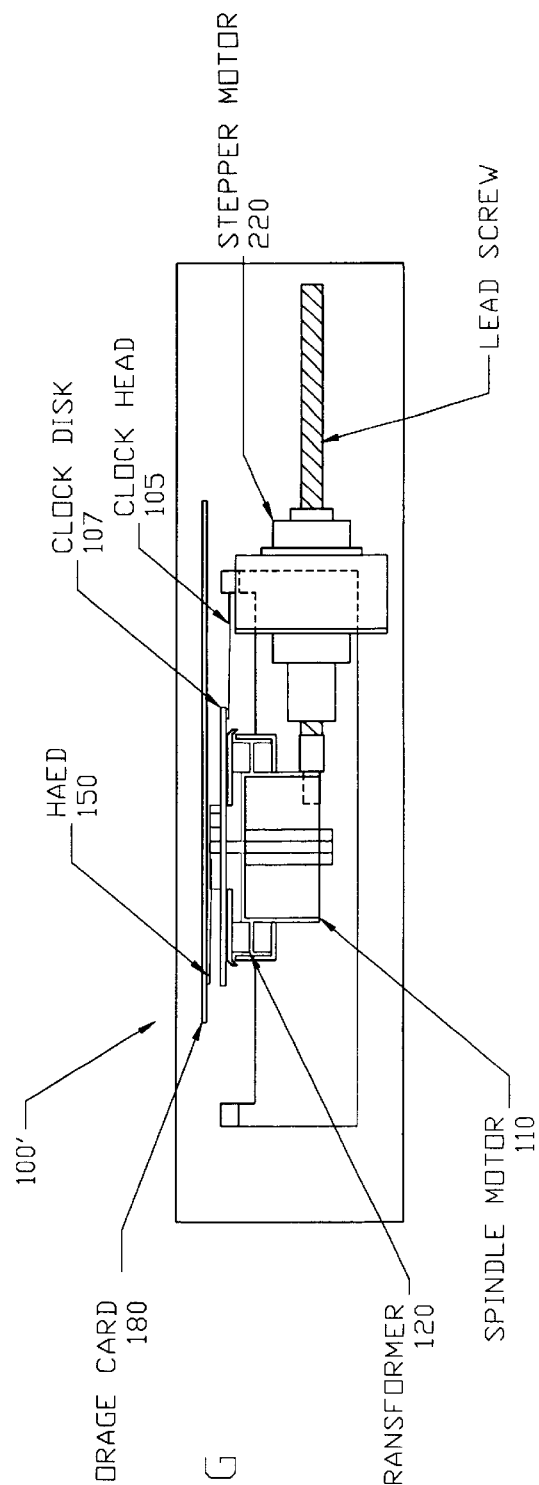

FIGS. 1F and 1G are a top view and a cross sectional view of a preferred embodiment of a data-card servo writer system 100', which has a clock head 105 connected to a clock disk 107. The clock disk 107 is disposed below the optical data card 180 and de-coupled from the data card 180. The motor drives the pickup head 150 also drives the clock disk 107. The clock disk can be rotated while the clock head 105 is fixed and stationary and mounted on the frame assembly of the servo writer system 100'. The clock head 105 is employed to write clock signals e.g., a binary bit 1 for the whole cycle. All of the data bits on the entire data track of the clock track are binary bit "1". Then, a pulse is stopped to write a binary bit "0" to provide that "0" as index while using all the bit "1" for timing to form at the card. Read and write signals of the clock head 105 is transmitted through wires to the clock disk 107 formed on a printed circuit board. The clock head 105 is employed to write the clock signals onto the optical clock disk and to read back the signals. The clock signals read back from the optical clock disk are used as timing signals to format the card to include the servo patterns to be further described below. Once the optical data-card 180 is formatted by the servo-writer system 100', it is ready for data read/write operations by applying a regular optical data-card drive system as that shown in FIGS. 1A to 1E. The formatted sectors on the optical data-card 180 are also write-protected to prevent incidental writing over these segments.

According to FIGS. 1A, 1B, 1C and 1D and above descriptions, the present invention discloses a data-card drive system 100 the present invention includes an optical data-card drive system. The drive system includes an optical pickup head for rotationally moving over and accessing data stored in the optical data-card. In a preferred embodiment, the optical pickup head is provided for reading data from and writing data to the optical data card. In another preferred embodiment, the optical pickup head is provided for accessing data over substantially one-half of the rotational movement. In another preferred embodiment, the optical pickup head is provided for accessing data over several arc-segments during the rotational movement. In another preferred embodiment, the optical pickup head is provided for rotating in a single rotational direction. In another preferred embodiment, the optical pickup head is provided for rotating in clockwise and counterclockwise directions. In another preferred embodiment, the optical pickup head is provided for rotating over arc segment having radius smaller than half-width of the optical data card. In another preferred embodiment, the optical pickup head is provided for rotating over an arc segment having a radius greater tan half-width of the optical data card. In another preferred embodiment, the optical pickup head is provided as a removable and replaceable module. In another preferred embodiment, the optical pickup head is provided for accessing data by contacting the optical data card. In another preferred embodiment, the optical pickup head is provided for accessing data by rotating at a distance above the optical data card. In another preferred embodiment, the optical data-card drive system of further includes a motor that has a rotating shaft for mounting and rotating the optical pickup head. In another preferred embodiment, the optical pickup head further includes a data signal transformer for transforming a data signal through data signal induced changes of magnetic flux.

FIG. 1E is a perspective view of an alternate configuration of a data signal transformer 120'. The data signal wires 130-1 connected to the pickup head 150' supported on the arm 152' for the pickup head 150' are first winding around an inner signal transforming cylinder 122', which rotates with the rotation shaft or the motor 110'. A stationary hollow pipe 124' is placed around the inner signal-transforming cylinder 122'. A set of signal transforming wires wrap around this stationary hollow pipe 124'. For read/write data, an electric signal representing a binary bit can be transferred from a pickup head 150' through the wires 135' to the wires wrapping around the inner signal-transforming cylinder 122'. The electric signals, typically an electric pulse, transferred to the wires around the inner cylinder 122' can be detected with variations of electromagnetic field by a set of wires wrapping around the stationary hollow pipe 124'. Similarly the data signal for the pickup head 150' can also be provided to the wires wrapping around the stationary hollow pipe 124' as electric pulses and detected by the wires wrapping around the inner signal transforming cylinder 122' for transfer to the pickup head 150'. The wires around the inner and outer cylindrical pipes function as inductive coils serving the function of data signal transformation.

Figure 2A:
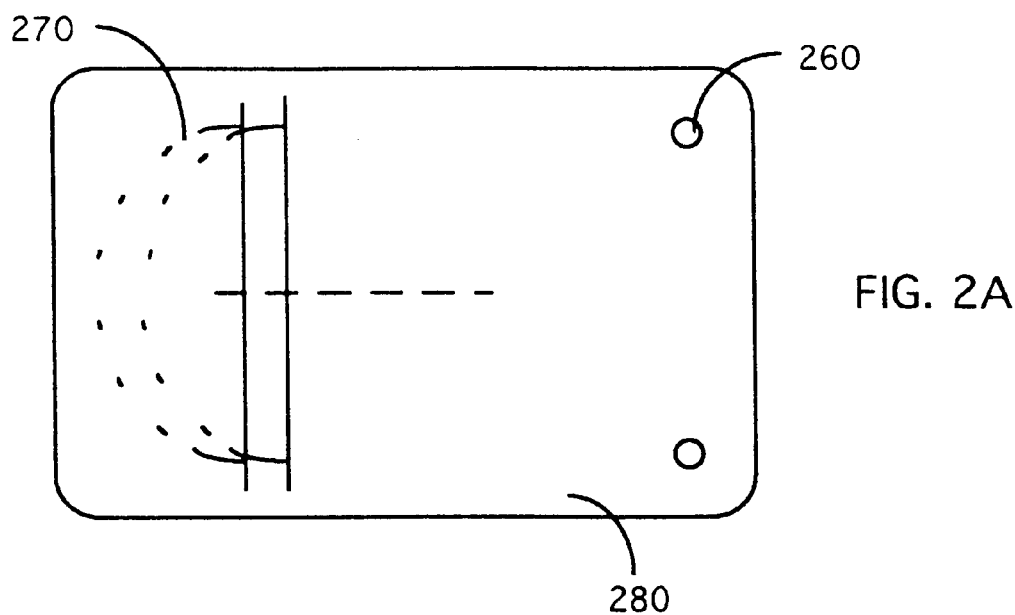
FIGS. 2A to 2C are respectively a top view, a cross sectional view and a bottom view of a data storage card with data tracks formed for storing bits with uniform density in each of these data tracks.
Figure 2B:
Figure 2C:
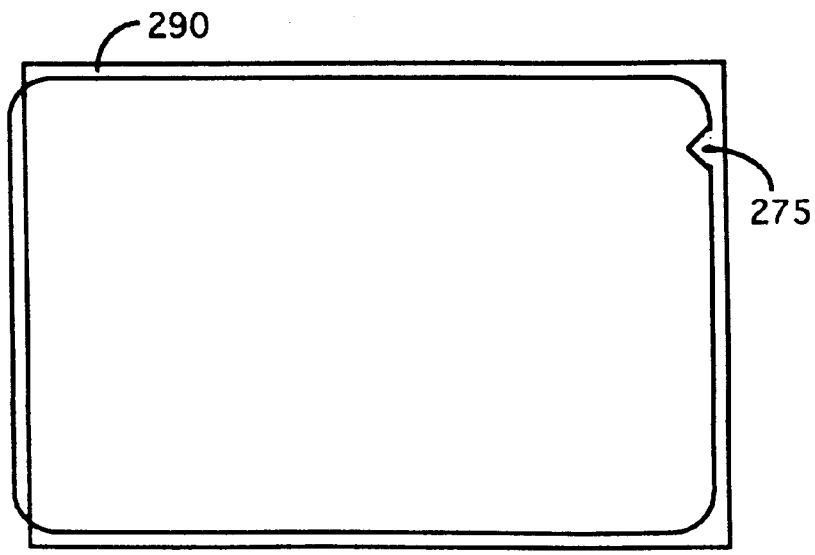

FIGS. 2A to 2C are respectively a top view, a cross sectional view, and a bottom view of a data card 180 of the present invention. The data card 180 is formed on a substrate plate 250. The substrate-plate 250 for optical recording is composed of non-magnetizable materials with a flat surface, e.g., a plastic or glass substrate plate. For optical recording, a magnetizable material can also be employed to form the substrate plate 250. The substrate plate 250 is then coated with a thin layer of recording medium on one side or both sides. For optical recording the coating are formed by optical particles coated on one-side or both sides of the substrate plate 250. The optical coating can be directly on the surface of the substrate plate 250 or on a Molar type of material with adhesive layer for attaching to the substrate plate 250. For optical recording the recording medium layer can be formed by a process similar to that of an optical compact-disk (CD), CDR, LD, or digital video display (DVD) disks. The data card 180 can be formed with standardized sizes, e.g., PCM-CIA standard sizes or standard credit card sizes, and has round or elongated holes 260 for fixing the card at pre-designated positions to initialize a data access operation. The holes 260 are fitted to the pins 190 to provide the self-centering and locking functions. The data storage card 280 can therefore be repeatedly placed at a pre-designated position with reliable accuracy. The data card 180 is provided with a plurality of data tracks 270 for storing data bit on each track. Each of these data tracks is formed as substantially an arc or arc-segments track. The data tracks 270 are substantially of a same length and are substantially parallel to each other. The data tracks 270 are formatted to include multiple sectors. One or several of these sectors can be flexibly employed to provide servo data for the purpose of identifying track locations to enhance sector seeking during a data-access operation. The servo-data are provided in sectors near both ends of the arc or arc-segments data tracks 270 as shown in FIG. 2A. For the purpose of more precisely positioning the data card 180 in a drive device, a notch 275 is formed near the inner end of the data card 180. With the notch 275, the data card 180 is more conveniently placed into the drive device fitted to the initial card position ready for operation relative to the position of the pickup head 150. The data card 180 is then covered by a protective coating 280 preventing damages from exposure to water, dust and other foreign particles introduced through the daily operational environment. The data card 180 is then stored in a data card envelop 290 for storage and shipment. The data storage tracks of the data card may contain user application and system configuration data. The recorded data can be updated in the field. Application system can either encrypt or decrypt the recorded data. Application system can also change the configuration such as set and reset the write protection, the password and other features related to the data-access operations.

Figure 2D:
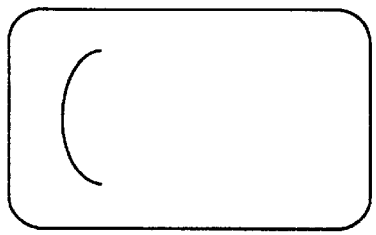
FIGS. 2D to 2Q show the top views of the data storage card of this invention where the data tracks can be arranged in arc-segments of different shapes sizes, and facing different directions.
Figure 2E:
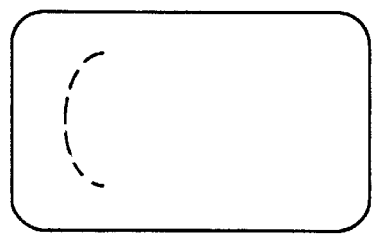
Figure 2F:
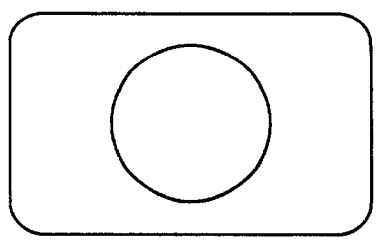
Figure 2G:
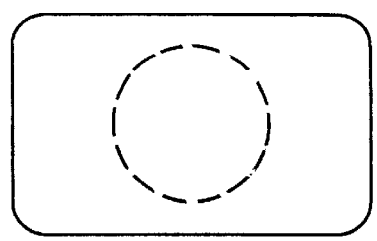
Figure 2H:
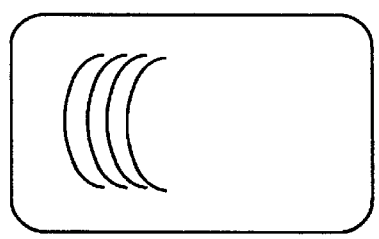
Figure 2I:
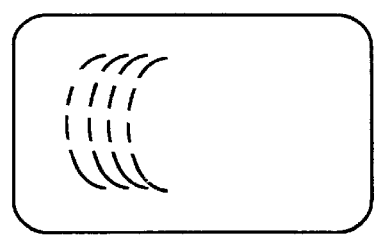
Figure 2J:
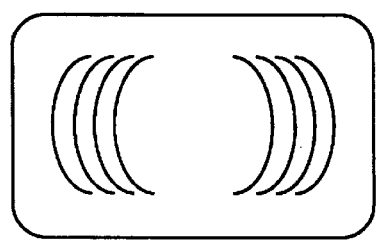
Figure 2K:
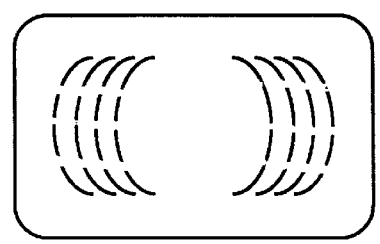
Figure 2L:
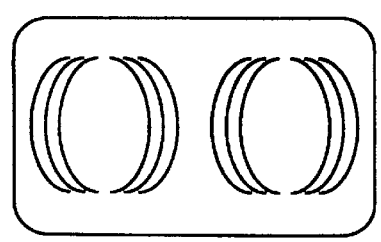
Figure 2M:
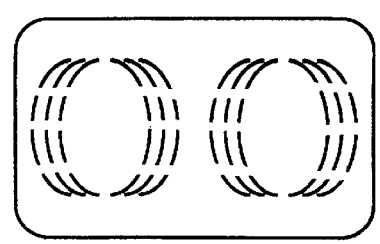
Figure 2N:
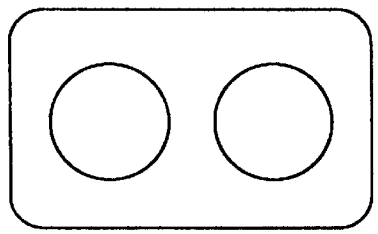
Figure 2O:
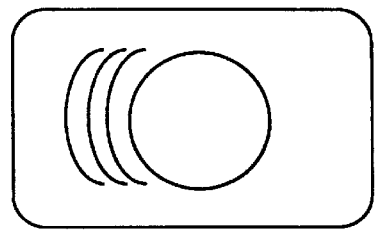
Figure 2P:
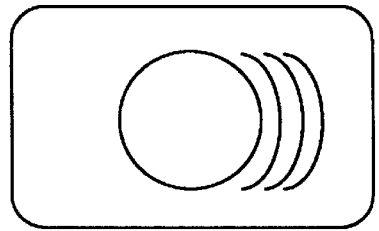
Figure 2Q:
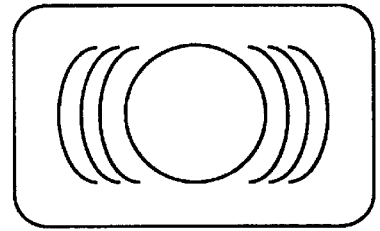

FIGS. 2D to 2Q are top views of the data storage card 180 for showing different configuration of the data tracks 270. The data tracks 270-1 can be parallel arcs facing opposite directions on either side of the data card 180 as shown in FIG. 2D. Alternately, each of the data tracks 270-1 as parallel arc as that shown in FIG. 2D, can be partitioned into a plurality of arc-segment 270-2 as that shown in FIG. 2E. In a similar manner, the data tracks can be parallel arcs 270-3 formed over the entire data card area as that shown in FIG. 2F. Furthermore, each of the parallel arcs 270-3 of FIG. 2F can also be partitioned into a plurality of arc segments 270-4 as that shown in FIG. 2G.

According to FIGS. 1 to 2, this invention discloses an optical data-storage card. The optical data-storage card includes an optical data-storage medium layer supported on the card. The data-storage medium layer includes a plurality of data storage tracks for storing data therein. Each of the tracks comprising at least an arc-segment wherein each of the data storage track being substantially parallel to a neighboring track. In a preferred embodiment, each of the arc-segments are substantially of a same segment length. In a preferred embodiment, the data-storage tracks further storing servo control data. In a preferred embodiment, the data-storage tracks further storing the servo-control data at a substantially same relative position on the data-storage tracks. In another preferred embodiment, the data-storage tracks further storing the servo-control data near edges of the data-storage card on the data-storage tracks. In another embodiment, each of the data-storage tracks is substantially a semicircular arc-segment. In another preferred embodiment, each of the data-storage tracks includes several arc segments. In another preferred embodiment, the optical data-storage card further includes self-positioning guiding means for guiding the card to a loading position when inserted into a data card drive device. In another preferred embodiment, the optical data storage card having a first side and a second side and the data-storage tracks are disposed on the first and second sides. In another preferred embodiment, the optical data storage further includes a card jacket for storing the data storage card.

Furthermore, this invention provides a new method for storing data in an optical data-storage card. The method includes the steps of a) providing an optical data-storage medium layer supported on the data-storage card. And, b) forming in the data-storage medium layer a plurality of data storage tracks for storing data therein by forming each of the tracks to include at least an arc-segment and each of the data storage tracks substantially parallel to a neighboring track. In a preferred embodiment, the step of forming the data-storage tracks as arc segments is a step of forming each of the arc segments substantially of a same segment length. In another preferred embodiment, the method further includes a step of storing servo control data in the data storage tracks. In another preferred embodiment, the step of storing the servo-control data is a step of storing the servo-control data at a substantially same relative position on the data-storage tracks. In another preferred embodiment, the step of storing the servo-control data is a step of storing the servo-control data near edges of the data-storage card on the data-storage tracks. In another preferred embodiment, the step of forming the data-storage to include at least an arc segment is a step of forming each of the data-storage tracks substantially as a semicircular arc-segment. In another preferred embodiment, the step of forming the data-storage to include at least an arc segment is a step of forming each of the data-storage tracks to include several arc segments. In another preferred embodiment, the method further includes a step of providing a self-positioning guiding means for guiding the optical data-storage card to a loading position when inserted into a data card drive device. In another preferred embodiment, the step of providing an optical data-storage medium layer supported on the card is a step of providing the optical data storage card to include a first side and a second side. And the step of forming in the data-storage medium layer a plurality of data storage tracks is a step of forming the data-storage tracks on the first and second sides. In another preferred embodiment, the method further includes a step of providing a card jacket for storing the data storage card.

Figure 3A:
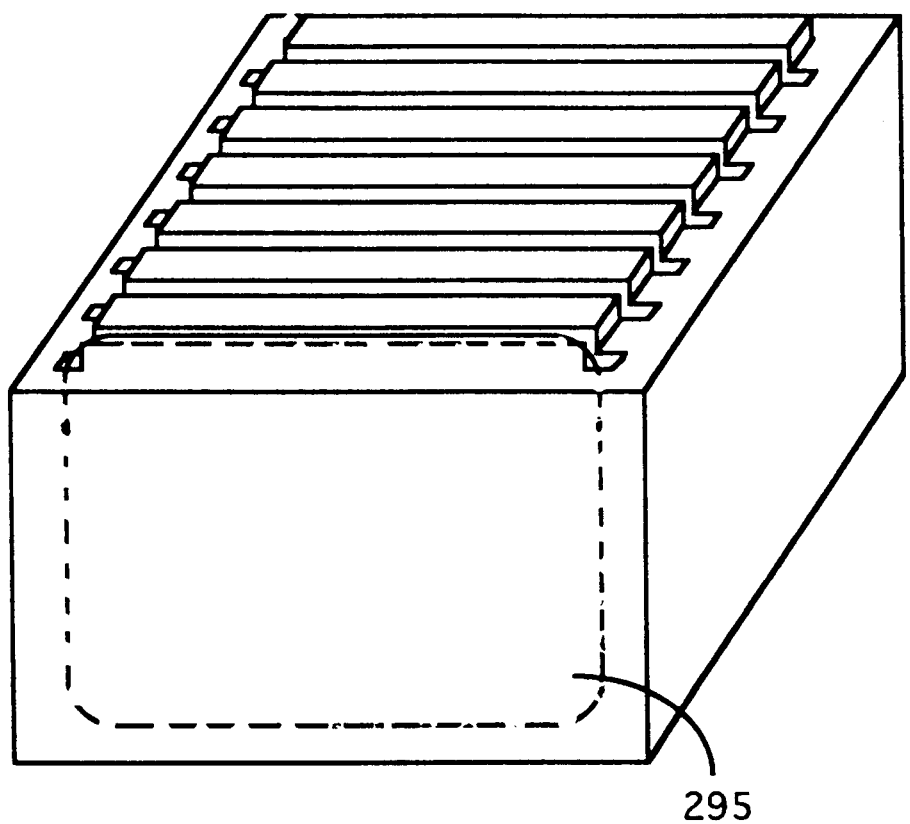
FIGS. 3A and 3B are perspective view and a cross-sectional view respectively of a data card storage box.
Figure 3B:
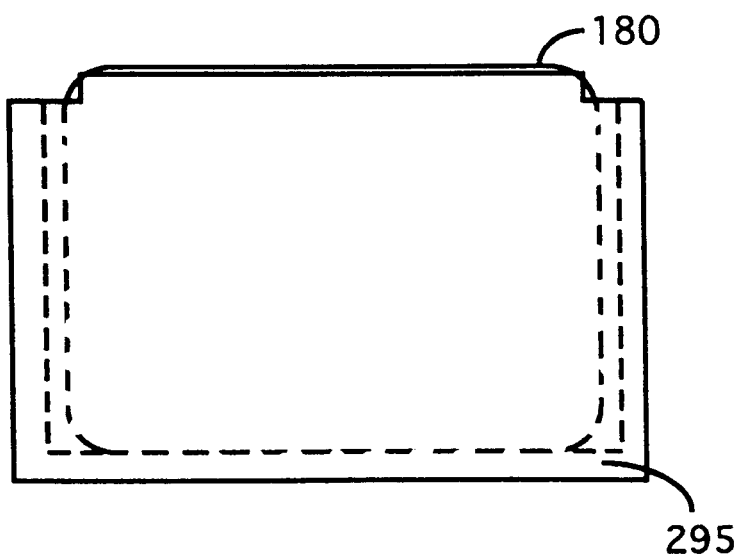

FIGS. 3A and 3B are a perspective view and a side view of a data card storage rack 295 for sorting a plurality of data card 180 therein. The data card storage rack 295 as shown can be formed as partitioned storage box with each compartment ready to receive one data card 180. The data card storage rack 295 can function as a portable digital camera album or a backup data store for long term data storage.

Figure 4:
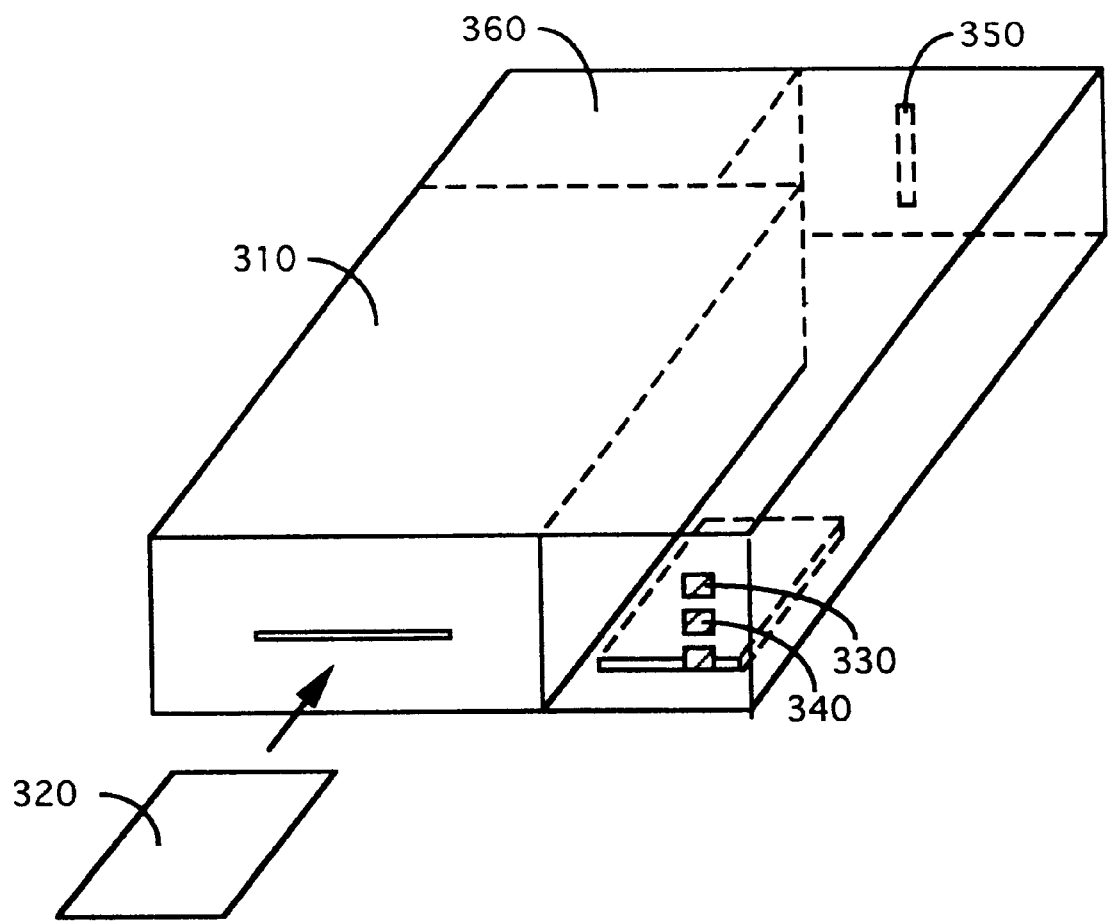
FIG. 4 is a functional block diagram of a subsystem of this invention includes a data card drive device of FIGS. 1A to 1C for reading/writing data storage card of FIGS. 2A to 2C.

FIG. 4 shows a subsystem 300 of this invention that includes a data card drive device 310 identical with the drive device 100 described above according to FIGS. 1A to 1C. The disk drive device 310 performs the data access tasks on a data storage card 320 identical to the data card 180 described above according to FIGS. 2A to 2C. The subsystem 300 further includes a local memory 330, which can be a DRAM or SRAM memory device connected to the disk drive device 310. The data stored in data card 320 can be first down loaded to the memory device 330 through a data bus for data storage. The subsystem 300 further includes a function control panel 340 to allow a user to control the subsystem startup, shutdown, save, update, and duplication of the data stored in the card. The subsystem 300 is further provided with a connection terminal 350 for connection to a personal computer, a printer, a scanner or other peripheral devices for operation together with the drive device subsystem 300. A power supply 360 is employed and connected to the subsystem 300 to provide power necessary for operating the drive device 310, the memory 340 and the control panel 330.

Referring to FIGS. 5A to 5C for examples to illustrate the servo signal patterns written onto the arc segments of the data-storage tracks on a data storage card. FIG. 5A shows the data storage tracks as arc segments, which may or may not be circular arcs. The servo writer must write servo signals on these data-tracks. Referring to FIG. 5B, the surface area of the optical data-storage card is divided into zones A to F according to clockwise direction. The servo writer should be disabled for Zones A, B, D, and E since these zones are not part of the data tracks. The servo writer must also be disabled in zone E because the servo data may be overlapped and create confusions in the process of pickup head location and track determinations. It is obvious the conventional servo writer and control mechanisms can no longer be employed for the optical data card drive system of this invention.

As shown in FIG. 5A, the length of the data tracks depends on the size and dimensions of the data card. Each data track is divided into N segments and each segment is provided to contain pre-defined servo data, prerecorded data and/or definitions of area for data records. FIG. 5C is an example of the data arrangements across the tracks of such segment. The total number of data tracks N is determined by the requirements of the accuracy of the mechanical and electrical responses. The servo data shown in FIG. 5C can provide the track profile, the location of the track and the relative location of signal pickup head to a data track along a track.

Referring to the details of data arrangement shown in FIG. 5C, the signals generated from data bit-patterns A and B are for position determination. Each data track has a half-data slots provided for A and half of the slots provided for B. The balance of A and B detected by the pickup head and the track location determination circuits provide indications that the pickup head is travelling in the center of the data track. Table 1 shows the data sample employed for providing servo data for track and location determinations as the pickup head is travelling over the surface of the optical data storage card.

TABLE 1

Example of Partial Servo Segment Data

| | | |
|---|---|---|
| SYNC | 1010101010101010 | |
| ADM | 1000000010000001 | |
| ST IDX | 11 for First Segment | 00 for other segments |
| ED IDX | 11 for last segment | 00 for other segments |
| A | 0000001100000000 | |
| B | 0000000000000011 | |

Referring to FIG. 5D, since the data track can only be arc-segments as that shown FIG. 5A, the servo writer must start and stop to layout patterns at pre-determined locations. An index is used as a reference point at a fixed location on the optical data-storage card. The starting point SX and the stopping point EX of the servo data are derived from the reference point IX as shown in FIG. 5D. A servo control circuit is employed to enable and disable the pattern layout process and to move the optical pickup head and the flat data-storage medium, i.e., the optical data storage card by using the feedback by detecting these three indices. An exemplary functional block diagram for implementing the control logic in the servo control circuit is shown in FIG. 5E.

According to FIGS. 5A to 5E, this invention discloses an optical servo writer. The optical servo writer includes an optical pickup head for rotationally moving over and writing servo data in an optical flat data-storage medium. The optical servo writer further includes a clock head for providing clock signals to the pickup head and to write clock signals in the clock disk. The optical pickup head is provided for writing SYNC data for synchronization of read channel, and ADM data for providing address mark for indicating data-types following the ADM data. The optical pickup head is provided for writing ST IDX data for indicating a first valid data segment, ED IDX data for indicating a last valid data segment, and GRAY CODE data for indicating a head number, a sector number, and a track number. Furthermore, the optical pickup head is provided for writing SERVOPOS data for indicating a relative position of signal head to a data track, DATA & GAP data for indicating an area for containing pre-recorded data. In a preferred embodiment, the optical pickup head is provided for writing index data for indicating a valid data track segment.

According to the functional block diagram of FIG. 5E, and FIGS. 1F and 1G, an optical servo writer is disclosed in this invention. The optical servo writer includes an optical pickup head for rotationally moving over and writing servo data in an optical flat data-storage medium. The optical servo writer further includes a clock head for providing clock signals to the pickup head and to write clock signals in the optical clock disk. The optical servo writer further includes a control circuit for controlling the optical pickup head for writing the servo data on the optical flat data-storage medium. The optical servo writer further includes a servo pattern layout circuit for controlling the optical pickup head for writing the servo data on the optical flat data-storage medium with predefined servo patterns. The optical servo writer further includes a derived index control circuit for deriving indices from a fixed index provided on the optical flat data-storage medium. The optical servo writer further includes a fixed index and clock track circuit for providing a fix index and a clock signal for controlling the optical pickup head for writing the servo data on the optical flat data-storage medium. The optical servo writer further includes a head move circuit for controlling a movement of the optical pickup head for writing the servo on data that one the optical flat data-storage medium. The optical servo writer further includes a medium movement circuit for controlling a linear movement of the optical flat data-storage medium for writing the servo data on the optical flat data-storage medium.

Therefore, the present invention discloses a data storage-card drive system with a pickup head moving above a data-storage card in rotational movement. The data read-write functions are enabled only for an arc segment, e.g., half-circle, or several arc segments of the rotational movement. The data tracks are arranged as plurality of parallel arcs, e.g., half-circles, or arc-segments with uniform data bit storage density. Specifically, a pickup head is provided, which is driven by a brushless motor to rotate over the data-storage card. The motor is mounted on a carriage for making horizontal movement along a longitudinal direction of the data card. The position of the pickup head is then servo-controlled by moving the carriage and the brushless motor while the data storage card either stays at a fixed position or making only forward-backward movements. The difficulties and limitations encountered in the prior art due to a non-uniform data storage density among different data tracks are resolved by this invention. The technical difficulties caused by problems in loading/unloading of the pickup head to the recording medium, the transfer of read/write signal between the pickup head and the processing circuits, and the self centering of the data card in a data card drive device are also resolved by this invention. Furthermore, the difficulty of positioning and lifting horizontal rotating pickup head parallel to a flat recording surface at any intermediate stop location to convert the signal from the flat card to parallel rotating pickup head to process circuit.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical servo writer comprising:

an optical pickup head for rotationally moving over and writing servo data in an optical flat data-storage medium;

a motor for driving said pickup head; and a clock disk de-coupled from said optical flat data-storage medium, said clock disk driven by said motor for rotating with said pickup head.

2. The optical servo writer of claim 1 wherein:

said clock disk providing clock signals to said pickup head and to write clock signals in an optical clock disk.

* * * * *